United States Patent
Yang et al.

(10) Patent No.: US 9,450,886 B2
(45) Date of Patent: Sep. 20, 2016

(54) BANDWIDTH ADJUSTMENT METHOD, BUS CONTROLLER, AND SIGNAL CONVERTOR

(71) Applicant: Huawei Technologies Co., Ltd., Shenzhen, Guangdong (CN)

(72) Inventors: Xueren Yang, Beijing (CN); Tao Lin, Shenzhen (CN); Jiehua Ye, Shenzhen (CN); Jianhua Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 205 days.

(21) Appl. No.: 14/027,931

(22) Filed: Sep. 16, 2013

(65) Prior Publication Data

US 2014/0016651 A1 Jan. 16, 2014

Related U.S. Application Data

(63) Continuation of application No. PCT/CN2011/077793, filed on Jul. 29, 2011.

(51) Int. Cl.
*H04L 12/40* (2006.01)
*H04L 12/917* (2013.01)
*G06F 13/42* (2006.01)

(52) U.S. Cl.
CPC .......... *H04L 47/76* (2013.01); *G06F 13/4295* (2013.01)

(58) Field of Classification Search
CPC . G06F 13/42; H04L 5/1438; H04L 12/4013; H04L 12/40013; H04L 69/24
See application file for complete search history.

(56) References Cited

U.S. PATENT DOCUMENTS

| | | | |
|---|---|---|---|
| 6,728,821 B1 | 4/2004 | James et al. | |
| 7,051,306 B2 | 5/2006 | Hoberman et al. | |
| 8,116,147 B1 * | 2/2012 | Uddenberg et al. | 365/189.11 |
| 2005/0235110 A1 * | 10/2005 | Mylly | 711/115 |
| 2005/0259685 A1 * | 11/2005 | Chang et al. | 370/469 |
| 2006/0023633 A1 * | 2/2006 | Caruk et al. | 370/252 |

(Continued)

FOREIGN PATENT DOCUMENTS

| | | |
|---|---|---|
| CN | 1527553 A | 9/2004 |
| CN | 1801731 A | 7/2006 |

(Continued)

OTHER PUBLICATIONS

Huang Wuling et al., "Embedded Linux dynamic power management technology", Sep. 2005, 5 pages.

(Continued)

*Primary Examiner* — Brandon Renner
*Assistant Examiner* — Scott M Sciacca

(57) ABSTRACT

Embodiments of the present invention provide a bandwidth adjustment method, a bus controller, and a signal convertor. The method includes: obtaining, by a bus controller, a first frequency and a first channel number; sending a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency; and receiving a negotiation result sent by the first peer end and controlling the physical component to transmit data according to the negotiation result. In the technical solutions of the embodiments of the present invention, bandwidth adjustment is flexible and the loss of data is avoided.

18 Claims, 7 Drawing Sheets

(56) References Cited

U.S. PATENT DOCUMENTS

| | | | |
|---|---|---|---|
| 2006/0280132 A1* | 12/2006 | Connor | 370/276 |
| 2007/0201492 A1* | 8/2007 | Kobayashi | 370/395.64 |
| 2008/0022024 A1* | 1/2008 | Mao | H04L 41/0896 710/104 |
| 2009/0022065 A1* | 1/2009 | Chen et al. | 370/253 |
| 2009/0327506 A1 | 12/2009 | Diab | |
| 2010/0169523 A1* | 7/2010 | Dunstan et al. | 710/104 |
| 2010/0316065 A1 | 12/2010 | Kapil et al. | |
| 2011/0038426 A1* | 2/2011 | Koba et al. | 375/257 |
| 2011/0158639 A1* | 6/2011 | Spadaro et al. | 398/25 |
| 2011/0264968 A1* | 10/2011 | Shilo et al. | 714/704 |
| 2012/0216084 A1* | 8/2012 | Chun et al. | 714/708 |
| 2012/0307878 A1* | 12/2012 | Vijayaraghavan et al. | 375/225 |

FOREIGN PATENT DOCUMENTS

| | | |
|---|---|---|
| CN | 101047711 A | 10/2007 |
| CN | 101841447 A | 9/2010 |
| EP | 1 940 093 A1 | 7/2008 |

OTHER PUBLICATIONS

International Search Report dated Apr. 26, 2012 in connection with International Patent Application No. PCT/CN2011/077793.

* cited by examiner

BANDWIDTH ADJUSTMENT METHOD, BUS CONTROLLER, AND SIGNAL CONVERTOR

CROSS-REFERENCE TO RELATED APPLICATIONS

This application is a continuation of International Application No. PCT/CN2011/077793, filed on Jul. 29, 2011, which is hereby incorporated by reference in its entirety.

TECHNICAL FIELD

Embodiments of the present invention relate to the field of communications technologies, and in particular, to a bandwidth adjustment method, a bus controller, and a signal convertor.

BACKGROUND

A signal convertor is usually used for high-speed signal transmission between components or between devices. For example, a serializer/deserializer (Serializer/Deserializer, hereinafter briefly referred to as SERDES) is a signal convertor. The SERDES is configured to perform a parallel/serial (that is, parallel-to-serial) conversion on output signals and a serial/parallel (that is, serial-to-parallel) conversion on input signals. The SERDES is a high-speed data communication technology on which the modern data communication field depends.

The existing SERDES includes two parts: a bus controller and a physical component. The physical component includes multiple data channels. The bus controller is configured to allocate a number of data channels for data transmission to the physical component during configuration initialization. The bus controller is further configured to control data transmission on the initially configured data channels. During the configuration initialization, a certain number of data channels on the physical component may be configured, and then the configured data channels may be trained and the communication bandwidth for the SERDES may be determined. Then data communication may be implemented according to the initialized configuration. This existing bandwidth configuration mode may be called static bandwidth configuration.

During the implementation of the present invention, the inventor discovers that the prior art has at least the following problems: The existing SERDES can only perform static bandwidth configuration, but cannot perform bandwidth configuration during data transmission; otherwise, data may be lost. Therefore, bandwidth adjustment of the existing SERDES is not flexible.

SUMMARY

Embodiments of the present invention provide a bandwidth adjustment method, a bus controller, and a signal controller, so as to solve the defect of inflexible bandwidth adjustment of a SERDES in the prior art.

An embodiment of the present invention provides a bandwidth adjustment method, including:

obtaining, by a bus controller, a first frequency and a first channel number, where the first frequency and the first channel number are a target frequency and a target channel number that need to be adjusted, respectively;

sending, by the bus controller, a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency; and receiving, by the bus controller, a negotiation result sent by the bus controller of the first peer end and controlling the physical component to transmit data according to the negotiation result.

An embodiment of the present invention provides a bus controller, including:

a first power consumption control module, configured to obtain a first frequency and a first channel number, where the first frequency and the first channel number are a target frequency and a target channel number that need to be adjusted, respectively;

a protocol processing module, configured to send a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency; and a second power consumption control module, configured to receive a negotiation result sent by the bus controller of the first peer end and control the physical component to transmit data according to the negotiation result.

An embodiment of the present invention further provides a signal convertor, including a bus controller and a physical component, where the bus controller is configured to obtain a first frequency and a first channel number, where the first frequency and the first channel number are a target frequency and a target channel number that need to be adjusted, respectively; send a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency; and receive a negotiation result sent by the bus controller of the first peer end and control the physical component to transmit data according to the negotiation result.

The embodiments of the present invention provide a bandwidth adjustment method, a bus controller, and a signal convertor. The bus controller obtains a first frequency and a first channel number, where the first frequency and the first channel number are a target frequency and a target channel number that need to be adjusted, respectively; sends a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency; and receives a negotiation result sent by the bus controller of the first peer end and controls the physical component to transmit data according to the negotiation result. By using the technical solutions in the embodiments of the present invention, bandwidth adjustment is flexible, bandwidth can be adjusted any time during transmission, and the loss of data is avoided. By using the technical solutions in the embodiments of the present invention, the bandwidth can be flexibly adjusted, so as to improve the data transmission efficiency. In the prior art, the bandwidth of a signal convertor such as a SERDES cannot be adjusted, and generally the configured preset bandwidth is usually higher than the actually required bandwidth; therefore, the power consumption of the signal convertor is high. The technical solutions in the embodiments of the present invention can transmit data according to the target frequency and the target channel number and the negotiation result with the bus controller of the peer end. In this way, the signal convertor such as the SERDES can operate in a more reasonable bandwidth range. Compared with the prior art, the technical solutions in the embodiments of the present invention can effectively reduce the power consumption of the signal convertor.

BRIEF DESCRIPTION OF DRAWINGS

To illustrate the technical solutions in the embodiments of the present invention more clearly, the accompanying drawings required for describing the embodiments are described briefly in the following. Apparently, the accompanying drawings in the following description merely show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
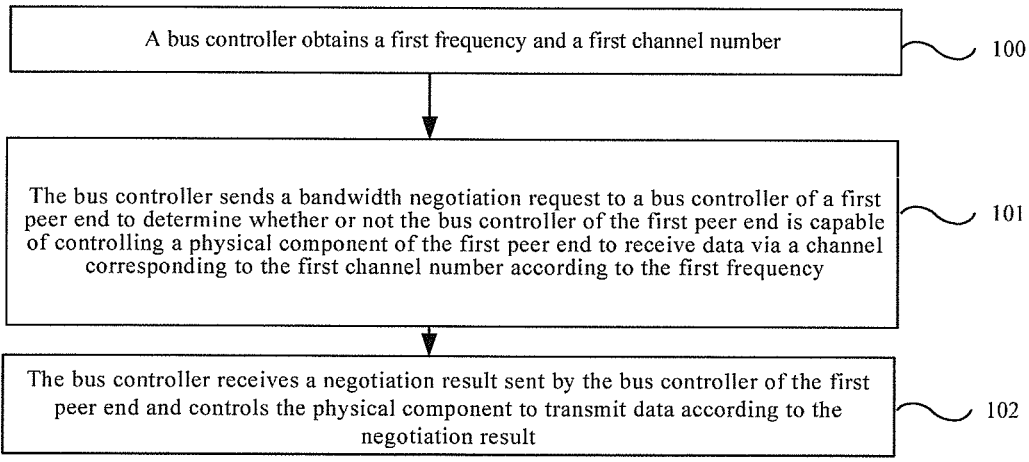
FIG. 1 is a flowchart of a bandwidth adjustment method according to an embodiment of the present invention.

FIG. 1 is a flowchart of a bandwidth adjustment method according to an embodiment of the present invention. The executor of the bandwidth adjustment method in this embodiment is a bus controller, which may specifically be a bus controller in a signal convertor, for example, a bus controller in a SERDES. As shown in FIG. 1, the bandwidth adjustment method in this embodiment may specifically include the following:

100: A bus controller obtains a first frequency and a first channel number.

The first frequency and the first channel number are a target frequency and a target channel number that need to be adjusted.

101: The bus controller sends a bandwidth negotiation request to a bus controller of a first peer end to determine whether or not the bus controller of the first peer end is capable of controlling a physical component of the first peer end to receive data via a channel corresponding to the first channel number according to the first frequency.

102: The bus controller receives a negotiation result sent by the bus controller of the first peer end and controls the physical component to transmit data according to the negotiation result.

During the operating of the physical component, two parameters are necessary, namely, a frequency and a channel number, so as to transmit data in a channel corresponding to the channel number according to the frequency. In this embodiment, the bus controller controls, according to the negotiation result with the bus controller of the first peer end, the physical device to transmit data via a channel corresponding to which channel number according to which frequency.

An application scenario of the bandwidth adjustment method in this embodiment is in a process of data transmission.

According to the bandwidth adjustment method in the embodiment of the present invention, a bus controller obtains a first frequency and a first channel number; sends a bandwidth negotiation request to a bus controller of a first peer end to determine whether or not the bus controller of the first peer end is capable of controlling a physical component of the first peer end to receive data via a channel corresponding to the first channel number according to the first frequency; and receives a negotiation result sent by the bus controller of the first peer end and controls the physical component to transmit data according to the negotiation result. By using the technical solution in this embodiment, bandwidth adjustment is flexible, bandwidth can be adjusted any time during transmission, and the loss of data is avoided, so as to effectively improve the data transmission efficiency. In the prior art, the bandwidth of a signal convertor such as a SERDES cannot be adjusted, and generally the configured preset bandwidth is usually higher than the actually required bandwidth; therefore, the power consumption of the signal convertor is high. The technical solution in this embodiment can transmit data according to a target frequency and a target channel number and the negotiation result with the bus controller of the peer end. In this way, the signal convertor such as the SERDES can operate in a more reasonable bandwidth range. Compared with the prior art, the technical solution in this embodiment can effectively reduce the power consumption of the signal convertor.

Optionally, in 101 in the foregoing embodiment, the bus controller sends the bandwidth negotiation request to the bus controller of the first peer end to determine whether or not the bus controller of the first peer end is capable of controlling the physical component of the first peer end to transmit data via the channel corresponding to the first channel number according to the first frequency. To facilitate description, the executor, the bus controller, in this embodiment is called a current bus controller. In a specific implementation, pre-stored operating status information on the bus controller of the first peer end includes an operating frequency range and a channel number range that are supported by the bus controller of the first peer end. The bus controller of the first peer end may judge whether the first frequency is in the operating frequency range in the pre-stored operating status information, and judge whether the first channel number is in the channel number range in the pre-stored operating status information. If yes, the bus controller of the first peer end determines that it is capable of controlling the physical component of the first peer end to receive data via the channel corresponding to the first channel number according to the first frequency. At this time, the bus controller of the first peer end sends the negotiation result indicating that it is capable of controlling the physical component of the first peer end to receive data via the channel corresponding to the first channel number according to the first frequency. If not, the bus controller of the first peer end determines that it is not capable of controlling the physical component of the first peer end to receive data via the channel corresponding to the first channel number according to the first frequency to the current bus controller. At this time, the bus controller of the first peer end sends the negotiation result indicating that it is not capable of controlling the physical component of the first peer end to receive data via the channel corresponding to the first channel number according to the first frequency to the current bus controller.

Figure 2:
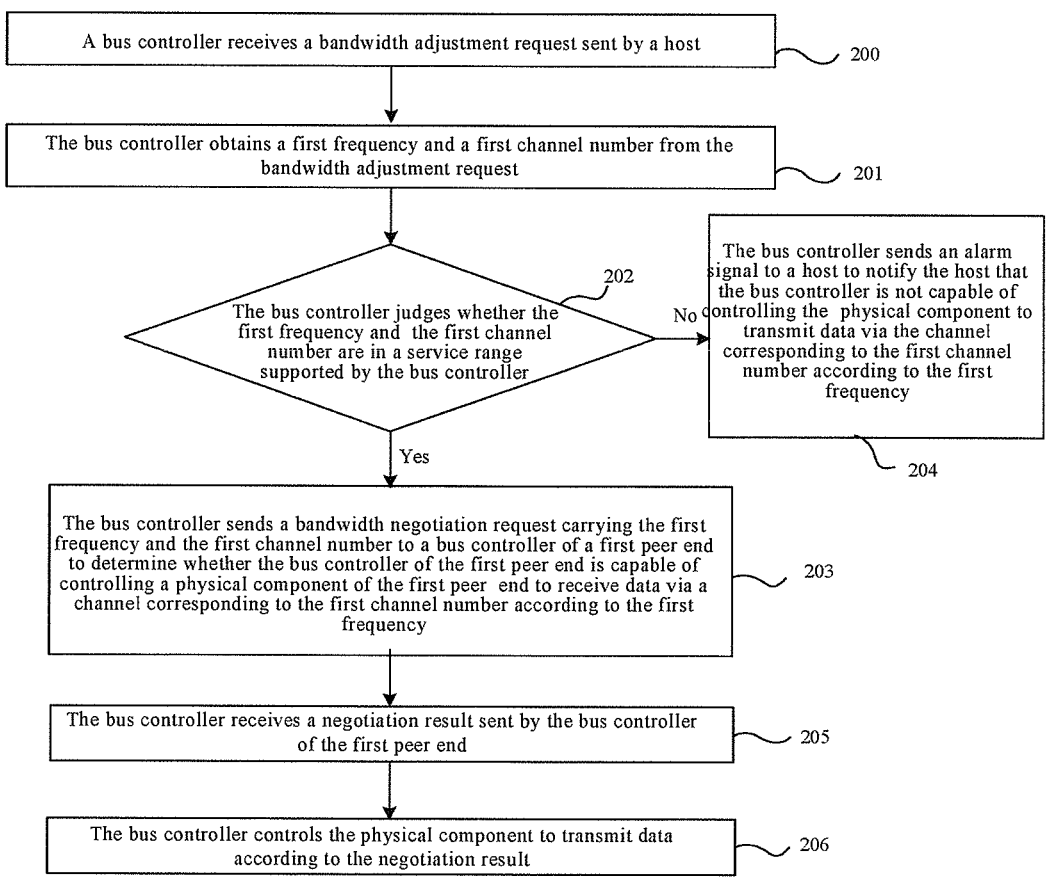
FIG. 2 is a flowchart of a bandwidth adjustment method according to another embodiment of the present invention.

FIG. 2 is a flowchart of a bandwidth adjustment method according to another embodiment of the present invention. The executor of the bandwidth adjustment method in this embodiment is a bus controller, which may specifically be a bus controller in a signal convertor, for example, a bus controller in a SERDES. As shown in FIG. 2, the bandwidth adjustment method in this embodiment may specifically include the following:

200: A bus controller receives a bandwidth adjustment request sent by a host, and 201 is executed.

The bandwidth adjustment request carries a first frequency and a first channel number.

Specifically, in this embodiment, the host may be considered as a device connected to a signal convertor to which the bus controller belongs. The host has a center processing unit (Central Processing Unit, hereinafter briefly referred to as CPU) to control to send various pieces of signaling to the bus controller. The bandwidth adjustment request may also be sent by a traffic monitor. The traffic monitor may be set in the signal convertor.

201: The bus controller obtains a first frequency and a first channel number from the bandwidth adjustment request, and 202 is executed.

Specifically, the foregoing 200 and 201 are a specific implementation manner of 100 in the embodiment shown in FIG. 1.

202: The bus controller judges whether the first frequency and the first channel number are in a service range supported by the bus controller, if the first frequency and the first channel number are in the service range supported by the bus controller, 203 is executed; otherwise, if the first frequency and/or the first channel number is not in the service range supported by the bus controller, 204 is executed.

A specific implementation manner is: The bus controller judges whether the first frequency is in a pre-stored operating frequency range and judge whether the first channel number is in a pre-stored channel number range in an operating status. If the first frequency is in the pre-stored operating frequency range and the first channel number is or is not in the channel number range in the pre-stored operating status, the first frequency and the first channel number may be determined to be in the service range supported by the bus controller. If the first frequency is in the pre-stored operating frequency range and/or the first channel number is or is not in the channel number range in the pre-stored operating status, the first frequency and the first channel number may be determined to be not in the service range supported by the bus controller.

203: The bus controller sends a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency, and 205 is executed.

In this embodiment, the bus controller of the first peer end is a bus controller of the other end connected to a signal convertor to which a current bus controller belongs. The signal convertor to which a current bus controller belongs is configured to send data to a signal convertor where the bus controller of the first peer end is located, so as to implement data transmission.

In a specific implementation, the bus controller of the first peer end judges whether the first frequency and the first channel number are in a service range supported by the bus controller of the first peer end. When the first frequency and the first channel number are in the service range supported by the bus controller of the first peer end, a negotiation result is that the bus controller of the first peer end is capable of controlling the physical component of the first peer end to receive data via the channel corresponding to the first channel number according to the first frequency. When the first frequency and the first channel number are not in the service range supported by the bus controller of the first peer end, a negotiation result is that the bus controller of the first peer end is not capable of controlling the physical component of the first peer end to receive data via the channel corresponding to the first channel number according to the first frequency. After determining the negotiation result, the bus controller of the first peer end sends the negotiation result to the bus controller.

Through the negotiation, it can be guaranteed that, the bus controller of the first peer end supports the negotiation result during data transmission, so as to guarantee that, when using the negotiated first frequency and the first channel number to transmit data, data can be normally transmitted with the bus controller of the first peer end without data loss.

204: The bus controller sends an alarm signal to a host to notify the host that the bus controller is not capable of controlling the physical component to transmit data via the channel corresponding to the first channel number according to the first frequency. The process ends.

205: The bus controller receives a negotiation result sent by the bus controller of the first peer end, and 206 is executed.

206: The bus controller controls the physical component to transmit data according to the negotiation result.

Specifically, when the negotiation result is that the bus controller of the first peer end is capable of controlling the physical component of the first peer end to receive data via the channel corresponding to the first channel number according to the first frequency, the bus controller controls the physical component to transmit data via the channel corresponding to the first channel number according to the first frequency.

When the negotiation result is that the bus controller of the first peer end is not capable of controlling the physical component of the first peer end to receive data via the channel corresponding to the first channel number according to the first frequency, the bus controller controls the physical component to transmit data continually via channels corresponding to a current first channel number according to a current operating frequency. In this way, a signal convertor such as a SERDES can operate in a more reasonable bandwidth range. Compared with the prior art, the power consumption of the signal convertor can be effectively reduced.

Further, when it is determined, according to the negotiation result, that the bus controller of the first peer end is not capable of controlling the physical component of the first peer end to receive data via the channel corresponding to the first channel number according to the first frequency, the bus controller may further send the alarm signal to the host to notify the host that the physical component is not capable of transmitting data via the channel corresponding to the first channel number according to the first frequency.

In this embodiment, the first frequency and the first channel number are received from exterior. This configuration mode may be called a manual configuration mode of bandwidth adjustment.

According to the bandwidth adjustment method in this embodiment, bandwidth adjustment is flexible, bandwidth can be adjusted any time during transmission, and the loss of data is avoided, so as to effectively improve the data transmission efficiency.

Figure 3:
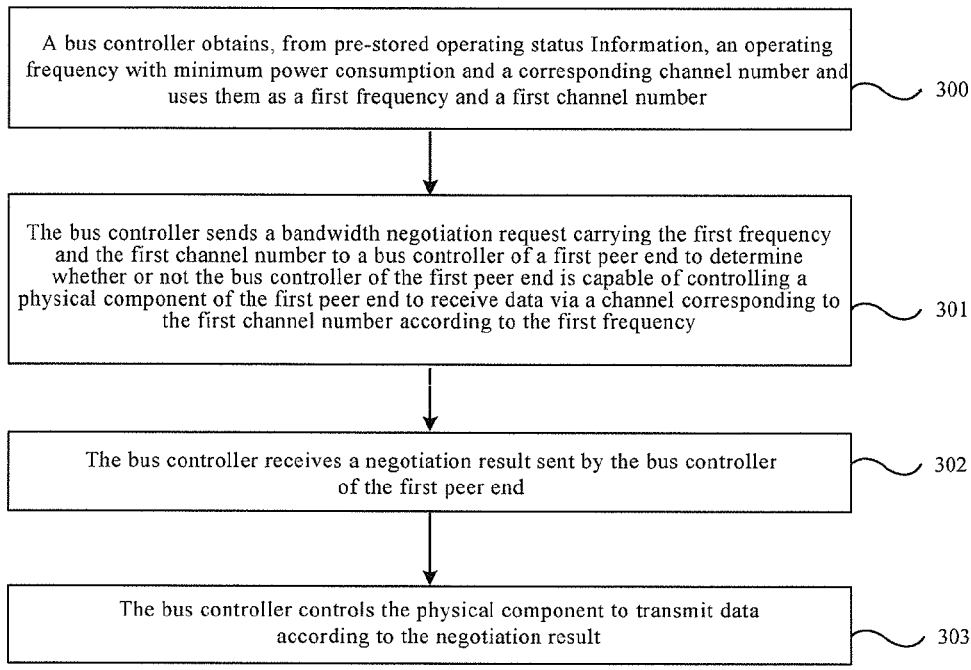
FIG. 3 is a flowchart of a bandwidth adjustment method according to still another embodiment of the present invention.

FIG. 3 is a flowchart of a bandwidth adjustment method according to still another embodiment of the present invention. The executor of the bandwidth adjustment method in this embodiment is a bus controller, which may specifically be a bus controller in a signal convertor, for example, a bus controller in a SERDES. As shown in FIG. 3, the bandwidth adjustment method in this embodiment may specifically include the following:

300: A bus controller obtains, from pre-stored operating status information, an operating frequency with minimum power consumption and a corresponding channel number and uses them as a first frequency and a first channel number, respectively.

This step is a specific implementation manner of 100 in the embodiment shown in FIG. 1.

It should be noted that, the bus controller may pre-store operating status information, where the pre-stored operating status information includes multiple combinations of operating frequencies and channel numbers that are supported by the bus controller. Each combination of a frequency and a channel number includes a frequency, a channel number, and corresponding power consumption. In this step, the bus controller may directly obtain an operating frequency and a corresponding channel number from a combination of an operating frequency with minimum power consumption and a corresponding channel number from the multiple combinations of operating frequencies and channel numbers, at this time, the bus controller does not need to judge whether the first frequency and the first channel number are in a service range supported by the bus controller.

301: The bus controller sends a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency.

The procedure of negotiation between the bus controller and the bus controller of the first peer end in this embodiment is the same as the procedure in the embodiment in FIG. 2. For details, reference may be made to relevant description in the above embodiment, and no further description is provided herein.

302: The bus controller receives a negotiation result sent by the bus controller of the first peer end.

303: The bus controller controls the physical component to transmit data according to the negotiation result.

The implementation of 303 is the same as the procedure in the embodiment in FIG. 2. For details, reference may be made to relevant description in the above embodiment, and no further description is provided herein.

In this embodiment, the first frequency and the first channel number are a frequency and a channel number that are corresponding to a combination of the frequency with minimum power consumption and a corresponding channel number that are obtained from the pre-stored operating status information by the bus controller. This configuration mode is called half-manual configuration mode of bandwidth adjustment.

According to the bandwidth adjustment method in this embodiment, bandwidth adjustment is flexible, bandwidth can be adjusted any time during transmission, and the loss of data is avoided, so as to effectively improve the data transmission efficiency. By using the technical solution in this embodiment, a signal convertor such as a SERDES can operate in a more reasonable bandwidth range. Compared with the prior art, the power consumption of the signal convertor can be effectively reduced.

Figure 4:
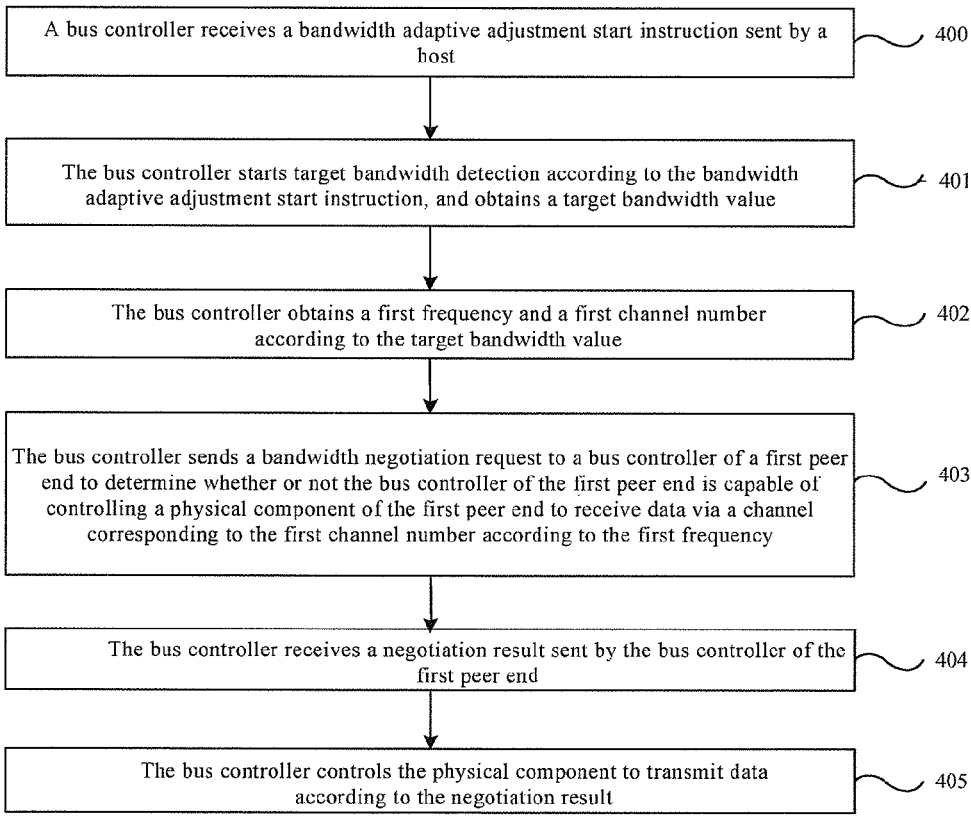
FIG. 4 is a flowchart of a bandwidth adjustment method according to still another embodiment of the present invention.

FIG. 4 is a flowchart of a bandwidth adjustment method according to still another embodiment of the present invention. The executor of the bandwidth adjustment method in this embodiment is a bus controller, which may specifically be a bus controller in a signal convertor, for example, a bus controller in a SERDES. As shown in FIG. 4, the bandwidth adjustment method in this embodiment may specifically include the following:

400: A bus controller receives a bandwidth adaptive adjustment start instruction sent by a host.

401: The bus controller starts target bandwidth detection according to the bandwidth adaptive adjustment start instruction, and obtains a target bandwidth value.

Specifically, the bus controller may implement the target bandwidth detection by detecting a data path, so as to obtain the target bandwidth value.

Optionally, here, the bus controller may also trigger and start the target bandwidth detection when half-manual configuration of bandwidth adjustment fails. In an actual application, the adaptive bandwidth adjustment in this embodiment may also be directly triggered when manual configuration of the bandwidth adjustment fails.

402: The bus controller obtains a first frequency and a first channel number according to the target bandwidth value.

The target bandwidth value is equal to the product of valid payload, the first frequency, and the first channel number, and may be expressed by using the following formula: $M = k*f*N$, where M indicates the target bandwidth value, k indicates the valid payload, f indicates the first frequency, and N indicates the first channel number. The valid payload k of a physical device may be a value preset based on experience.

The bus controller may specifically obtain the first frequency and the first channel number according to the target bandwidth value in the following manners:

(1) The bus controller obtains all combinations of frequencies and channel numbers in a bandwidth value range. Each combination of a frequency and a channel number includes a frequency, a channel number, and corresponding power consumption.

According to the foregoing formula, it can be known that, a determined target bandwidth value corresponds to multiple combinations of frequencies and channel numbers.

The bandwidth value range is a range between the target bandwidth value and a maximum bandwidth value supported by the bus controller in pre-stored operating status information.

Specifically, the pre-stored operating status information in the bus controller stores all combinations of frequencies and channel numbers that are corresponding to bandwidth values supported by the bus controller. Therefore, the bus controller may obtain all the combinations of frequencies and channel numbers in the bandwidth value range by querying the pre-stored operating status information. Each combination of a frequency and a channel number includes a frequency corresponding to a target bandwidth value in the bandwidth value range and a channel number that is corresponding to the target bandwidth value in the frequency.

(2) The bus controller obtains a combination of a frequency with minimum power consumption and a channel number from all the combinations of frequencies and channel numbers. The frequency in the combination of the frequency with minimum power consumption and the channel number is used as the first frequency, and the channel number in the combination of the frequency with minimum power consumption and the channel number is used as the first channel number.

The foregoing 400, 401, and 402 are a specific implementation manner of 100 in the embodiment shown in FIG. 1.

In this embodiment, the bus controller obtains the first frequency and the first channel number from the pre-stored operating status information, indicating that the bus controller supports a service corresponding to the first frequency and the first channel number. In this case, the bus controller does not need to judge whether the first frequency and the first channel number are in a service range supported by the bus controller.

403: The bus controller sends a bandwidth negotiation request to a bus controller of a first peer end to determine whether or not the bus controller of the first peer end is capable of controlling a physical component of the first peer end to receive data via a channel number corresponding to the first channel number according to the first frequency.

The procedure of negotiation between the bus controller and the bus controller of the first peer end in this embodiment is the same as the procedure in the embodiment in FIG. 2. For details, reference may be made to relevant description in the above embodiment, and no further description is provided herein.

404: The bus controller receives a negotiation result sent by the bus controller of the first peer end.

405: The bus controller controls the physical component to transmit data according to the negotiation result.

The implementation of 405 is the same as the procedure in the embodiment in FIG. 2. For details, reference may be made to relevant description in the above embodiment, and no further description is provided herein.

In this embodiment, the bus controller adaptively adjusts the bandwidth. Therefore, the bandwidth adjustment mode in this embodiment is called an adaptive bandwidth adjustment mode.

According to the bandwidth adjustment method in this embodiment, bandwidth adjustment is flexible, bandwidth can be adjusted any time during transmission, and the loss of data is avoided, so as to effectively improve the data transmission efficiency. By using the technical solution in this embodiment, a SERDES can operate in a more reasonable bandwidth range. Compared with the prior art, the power consumption of a signal convertor can be effectively reduced.

Optionally, the following may be further included based on the technical solutions in the embodiments shown in FIG. 1, FIG. 2, FIG. 3, and FIG. 4:

(a) The bus controller receives a negotiation request sent by a bus controller of a second peer end.

The negotiation request carries a second frequency and a second channel number.

(b) The bus controller detects whether the second frequency and the second channel number are reasonable.

For example, the bus controller may judge whether the second frequency and the second channel number are reasonable by detecting whether the second frequency is in a pre-stored operating frequency range and detecting whether the second channel number is in a pre-stored channel number range, where when the second frequency is in the pre-stored operating frequency range and the second channel number is in the pre-stored channel number range, the detection result is reasonable otherwise, when the second frequency is not in the pre-stored operating frequency range and/or the second channel number is not in a pre-stored range numbers of channels in an operating status, the detection result is not reasonable.

(c) The bus controller sends a detection result to the bus controller of the second peer end.

In an application scenario of this technical solution, a current bus controller is used as a receiver, and the bus controller of the second peer end is used as a data sender. When the bus controller of the second peer end needs to send data to a signal convertor where the bus controller is located in a condition of using the second frequency and the second channel number, the bus controller of the second peer end negotiates with the bus controller. The implementation principle of the solution is the same as the implementation principles in FIG. 1, FIG. 2, FIG. 3, and FIG. 4. The operations executed by the bus controller in the solution are the same as the operations executed by the bus controller of the first peer end in the foregoing embodiment. The operations executed by the bus controller of the second peer end are the same as the operations executed by the bus controller in the foregoing embodiment. For detailed implementation procedure, reference may be made to relevant description in the above relevant embodiment.

Figure 5A:
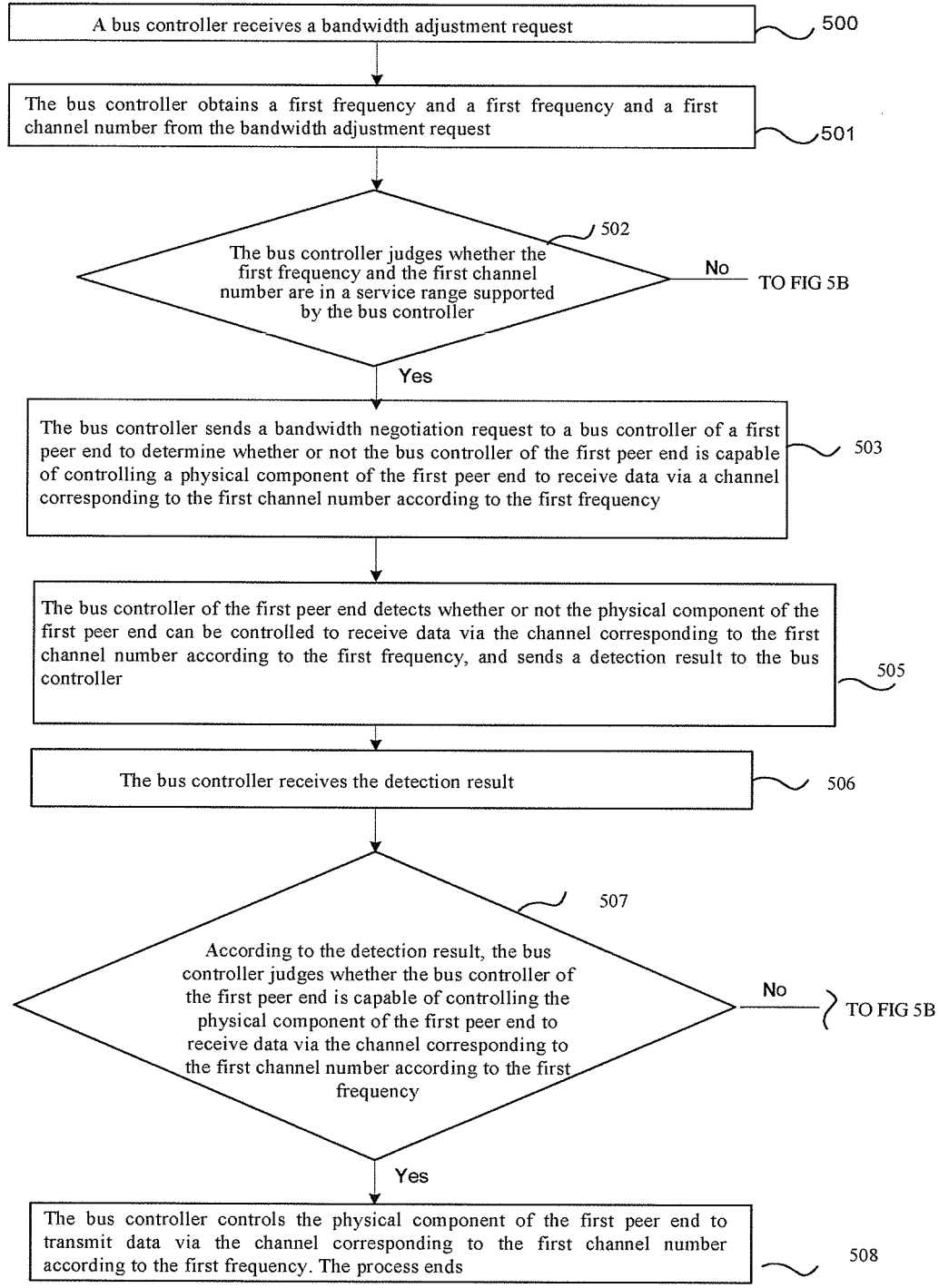
FIG. 5A and FIG. 5C are flowchart of a bandwidth adjustment method according to still another embodiment of the present invention.
Figure 5B:
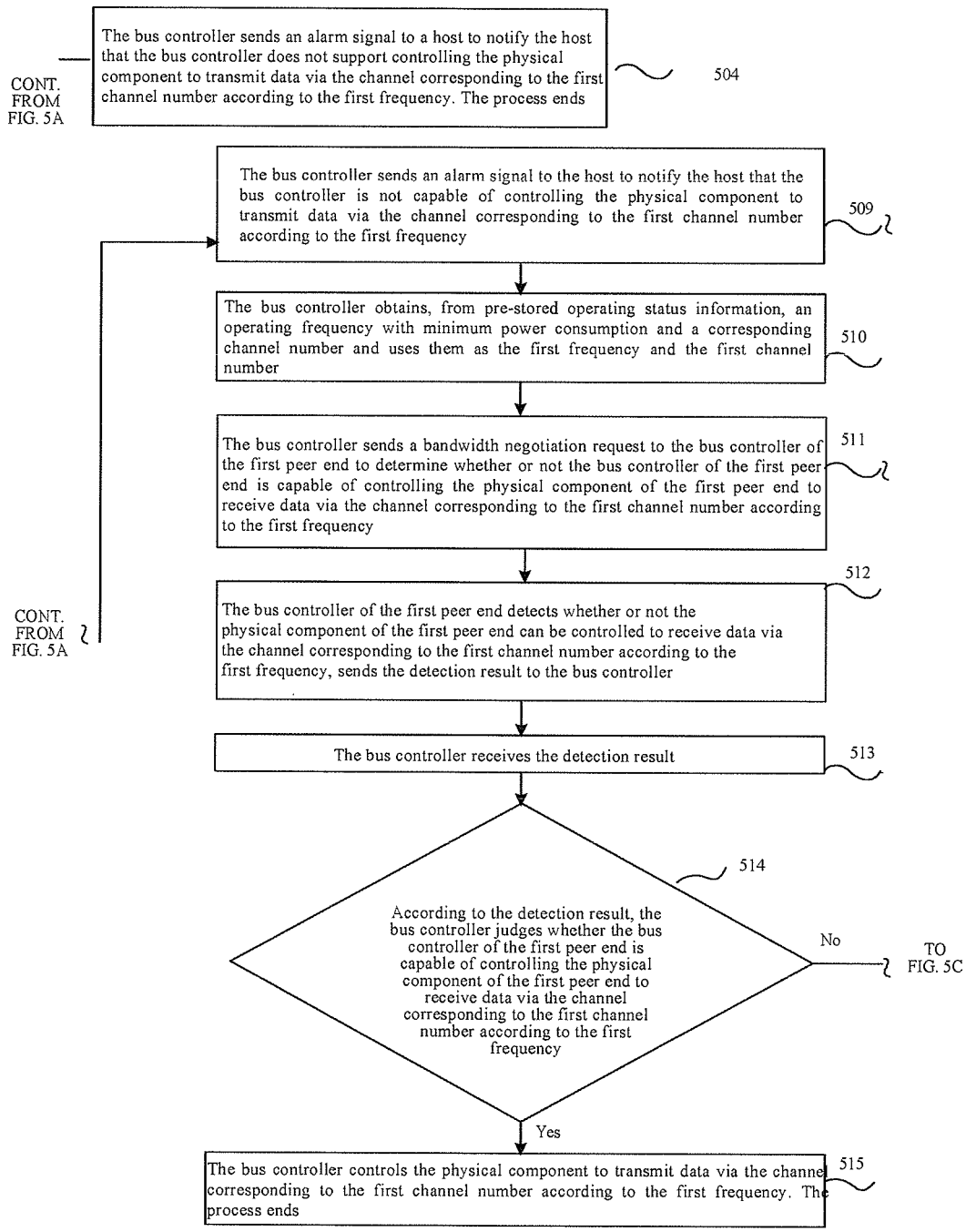
Figure 5C:
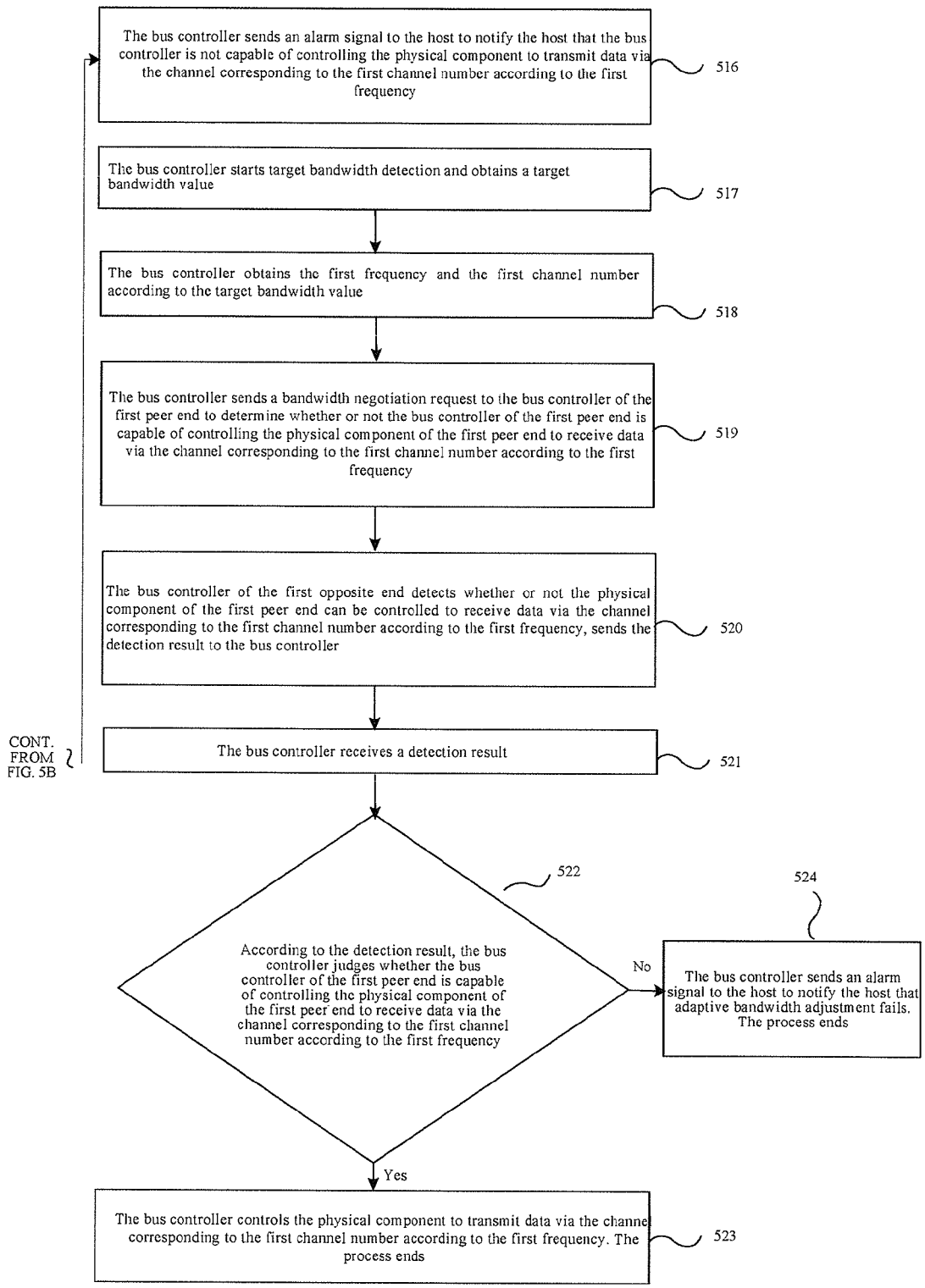

FIG. 5 is a flowchart of a bandwidth adjustment method according to still another embodiment of the present invention. As shown in FIG. 5, the bandwidth adjustment method in this embodiment may specifically include the following:

500: A bus controller receives a bandwidth adjustment request, and 501 is executed.

The bandwidth adjustment request carries a first frequency and a first channel number. The first frequency and the first channel number are a frequency and a channel number of a physical component after bandwidth adjustment is performed.

501: The bus controller obtains a first frequency and a first channel number from the bandwidth adjustment request, and 502 is executed.

502: The bus controller judges whether the first frequency and the first channel number are in a service range supported by the bus controller, if the first frequency and the first channel number are in the service range supported by the bus controller, 503 is executed; otherwise, if the first frequency and/or the first channel number is not in the service range supported by the bus controller, 504 is executed.

503: The bus controller sends a bandwidth negotiation request to a bus controller of a first peer end to determine whether or not the bus controller of the first peer end is capable of controlling a physical component of the first peer end to receive data via a channel corresponding to the first channel number according to the first frequency, and 505 is executed.

504: The bus controller sends an alarm signal to a host to notify the host that the bus controller does not support controlling the physical component to transmit data via the channel corresponding to the first channel number according to the first frequency. The process ends.

505: The bus controller of the first peer end detects whether or not the physical component of the first peer end can be controlled to receive data via the channel corresponding to the first channel number according to the first frequency, sends a detection result to the bus controller, and 506 is executed.

The bus controller of the first peer end determines whether or not the bus controller of the first peer end is capable of controlling the physical component of the first peer end to receive data via the channel corresponding to the first channel number according to the first frequency by detecting whether the first frequency and the first channel number are reasonable. For details, reference may be made to the description in the above relevant embodiments, and no further description is provided herein.

506: The bus controller receives the detection result, and 507 is executed.

507: According to the detection result, the bus controller judges whether the bus controller of the first peer end is capable of controlling the physical component of the first peer end to receive data via the channel corresponding to the first channel number according to the first frequency. When the bus controller of the first peer end is capable of controlling the physical component of the first peer end to receive data via the channel corresponding to the first channel number according to the first frequency, 508 is executed. When the bus controller of the first peer end is not capable of controlling the physical component of the first peer end to receive data via the channel corresponding to the first channel number according to the first frequency, 509 is executed.

508: The bus controller controls the physical component to transmit data via the channel corresponding to the first channel number according to the first frequency. The process ends.

509: The bus controller sends an alarm signal to the host to notify the host that the bus controller is not capable of controlling the physical component to transmit data via the channel corresponding to the first channel number according to the first frequency, and 510 is executed.

The bus controller is not capable of controlling the physical component to receive data via the channel corresponding to the first channel number according to the first frequency because the bus controller of the first peer end that communicates with it does not support controlling the physical component of the first peer end to transmit data via the channel corresponding to the first channel number according to the first frequency.

510: The bus controller obtains, from pre-stored operating status information, an operating frequency with minimum power consumption and a corresponding channel number and uses them as the first frequency and the first channel number, respectively, and 511 is executed.

After the execution of 509 is complete, it can be known that, manual configuration of bandwidth adjustment fails, so a half-manual configuration mode of the bandwidth adjustment is triggered. The half-manual configuration mode of the bandwidth adjustment starts from 510.

511: The bus controller sends a bandwidth negotiation request to the bus controller of the first peer end to determine whether or not the bus controller of the first peer end is capable of controlling the physical component of the first peer end to receive data via the channel corresponding to the first channel number according to the first frequency, and 512 is executed.

512: The bus controller of the first peer end detects whether or not the physical component of the first peer end can be controlled to receive data via the channel corresponding to the first channel number according to the first frequency, sends the detection result to the bus controller, and 513 is executed.

513: The bus controller receives the detection result, and 514 is executed.

514: According to the detection result, the bus controller judges whether the bus controller of the first peer end is capable of controlling the physical component of the first peer end to receive data via the channel corresponding to the first channel number according to the first frequency. When the bus controller of the first peer end is capable of controlling the physical component of the first peer end to receive data via the channel corresponding to the first channel number according to the first frequency, 515 is executed. When the bus controller of the first peer end is not capable of controlling the physical component of the first peer end to receive data via the channel corresponding to the first channel number according to the first frequency, 516 is executed.

515: The bus controller controls the physical component to transmit data via the channel corresponding to the first channel number according to the first frequency. The process ends.

516: The bus controller sends an alarm signal to the host to notify the host that the bus controller is not capable of controlling the physical component to transmit data via the channel corresponding to the first channel number according to the first frequency, and 517 is executed.

After the execution of 516 is complete, it can be known that, the half-manual configuration of the bandwidth adjustment fails, so an adaptive configuration mode of the bandwidth adjustment is triggered. The adaptive configuration mode of the bandwidth adjustment starts from 517.

517: The bus controller starts target bandwidth detection and obtains a target bandwidth value, and 518 is executed.

518: The bus controller obtains the first frequency and the first channel number according to the target bandwidth value, and 519 is executed.

The first frequency and the first channel number that are obtained by the bus controller are a combination of the frequency with minimum power consumption and the channel number that is corresponding to the target bandwidth value. For details of the obtaining first channel number procedure, reference may be made to the description in the above relevant embodiments, and no further description is provided herein.

519: The bus controller sends a bandwidth negotiation request to the bus controller of the first peer end to determine whether or not the bus controller of the first peer end is capable of controlling the physical component of the first peer end to receive data via the channel corresponding to the first channel number according to the first frequency, and 520 is executed.

520: The bus controller of the first peer end detects whether or not the physical component of the first peer end can be controlled to receive data via the channel corresponding to the first channel number according to the first frequency, sends the detection result to the bus controller, and 521 is executed.

521: The bus controller receives the detection result, and 522 is executed.

522: According to the detection result, the bus controller judges whether the bus controller of the first peer end is capable of controlling the physical component of the first peer end to receive data via the channel corresponding to the first channel number according to the first frequency. When the bus controller of the first peer end is capable of controlling the physical component of the first peer end to receive data via the channel corresponding to the first channel number according to the first frequency, 523 is executed. When the bus controller of the first peer end is not capable of controlling the physical component of the first peer end to receive data via the channel corresponding to the first channel number according to the first frequency, 524 is executed.

523: The bus controller controls the physical component to transmit data via the channel corresponding to the first channel number according to the first frequency. The process ends.

524: The bus controller sends an alarm signal to the host to notify the host that adaptive bandwidth adjustment fails. The process ends.

For a specific implementation manner of each step in this embodiment, reference may be made to the implementation of a relevant step in the above embodiments, and no further description is provided herein.

According to the bandwidth adjustment method in this embodiment, bandwidth can be flexibly adjusted. For example, a data channel number can be reduced when data volume is small, so as to reduce waste of the bandwidth and reduce the power consumption. When data volume is large, the data channel number can be increased to avoid congestion of a data channel and data loss. By using the technical solution in this embodiment, the data transmission efficiency can be effectively improved. By using the technical solution in this embodiment, a SERDES can operate in a more reasonable bandwidth range. Compared with the prior art, the power consumption of a signal convertor can be effectively reduced.

Persons of ordinary skill in the art should understand that, all or part of the steps of the foregoing method embodiments may be implemented by a program instructing relevant hardware. The foregoing program may be stored in a computer readable storage medium. When the program runs, the above steps included in the method embodiments are performed. The foregoing storage medium may be any medium capable of storing program codes, such as a ROM, a RAM, a magnetic disk, an optical disk, or the like.

Figure 6:
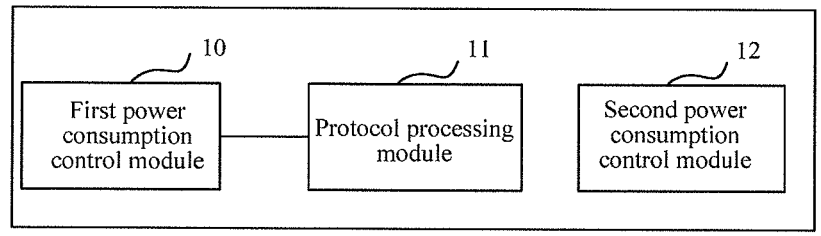
FIG. 6 is a schematic structural diagram of a bus controller according to an embodiment of the present invention.

FIG. 6 is a schematic structural diagram of a bus controller according to an embodiment of the present invention. As shown in FIG. 6, the bus controller in this embodiment includes a first power consumption control module 10, a protocol processing module 11, and a second power consumption control module 12.

The first power consumption control module 10 is configured to obtain a first frequency and a first channel number. The first frequency and the first channel number are a target frequency and a target channel number that need to be adjusted. The protocol processing module 11 is connected to the first power consumption control module 10. The protocol processing module 11 is configured to send a bandwidth negotiation request carrying the first frequency and the first channel number that are obtained by the first power consumption control module 10 to a bus controller of a first peer end to determine whether or not the bus controller of the first peer end is capable of controlling a physical component of the first peer end to receive data via channel corresponding to the first channel number according to the first frequency obtained by the first power consumption control module 10. The second power consumption control module 12 is configured to receive a negotiation result sent, according to the negotiation request sent by the protocol processing module 11, by the bus controller of the first peer end and controls the physical component to transmit data according to the negotiation result.

By using the above modules, the bus controller in this embodiment implements bandwidth adjustment, which is the same as the implementation mechanism of the above relevant method embodiments in the patent. For details, reference may be made to the description in the above relevant method embodiments, and no further description is provided herein.

By using the above modules, the bus controller in this embodiment obtains the first frequency and the first channel number, sends the bandwidth negotiation request carrying the first frequency and the first channel number to the bus controller of the first peer end to determine whether or not the bus controller of the first peer end is capable of controlling the physical component of the first peer end to receive data via the channel corresponding to the first channel number according to the first frequency, and receives the negotiation result sent by the bus controller of the first peer end and controls the physical component to transmit data according to the negotiation result. By using the technical solution in this embodiment, bandwidth adjustment is flexible, bandwidth can be adjusted any time during transmission, and the loss of data is avoided, so as to effectively improve the data transmission efficiency. In the prior art, the bandwidth of a signal convertor such as a SERDES cannot be adjusted, and generally the configured preset bandwidth is usually higher than the actually required bandwidth; therefore, the power consumption of the signal convertor is high. The technical solution in this embodiment can transmit data according to the target frequency and the target channel number and the negotiation result with the bus controller of the peer end. In this way, the signal convertor such as the SERDES can operate in a more reasonable bandwidth range. Compared with the prior art, the technical solution in this embodiment can effectively reduce the power consumption of the signal convertor.

Figure 7:
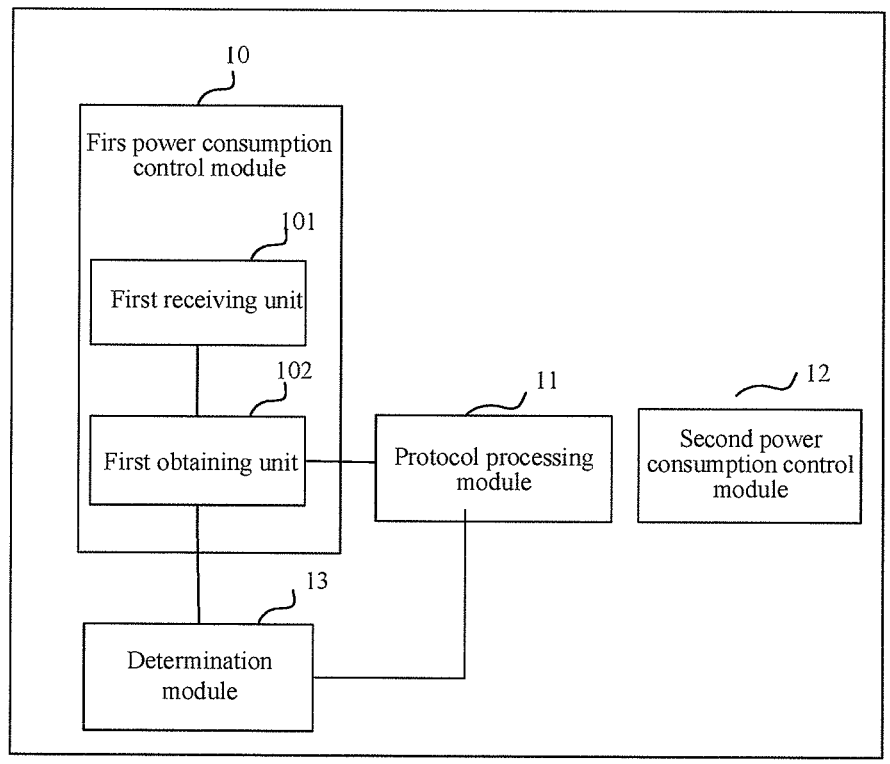
FIG. 7 is a schematic structural diagram of a bus controller according to another embodiment of the present invention.

FIG. 7 is a schematic structural diagram of a bus controller according to another embodiment of the present invention. As shown in FIG. 7, the bus controller in this embodiment is based on the embodiment shown in FIG. 6. The first power consumption control module 10 includes a first receiving unit 101 and a first obtaining unit 102.

The first receiving unit 101 is configured to receive a bandwidth adjustment request sent by a host, where the bandwidth adjustment request carries the first frequency and the first channel number. The first obtaining unit 102 is connected to the first receiving unit 101. The first obtaining unit 102 is configured to obtain the first frequency and the first channel number from the bandwidth adjustment request received by the first receiving unit 101.

Optionally, the bus controller in this embodiment further includes a determination module 13. The determination module 13 is connected to the first obtaining unit 102. The determination module 13 is configured to determine that the first frequency obtained by the first obtaining unit 102 is in a pre-stored operating frequency range and determine the first channel number that is obtained by the first obtaining unit 102 is in a channel number range in a pre-stored operating status. The determination module 13 is further connected to the protocol processing module 11. The determination module 13 can trigger the protocol processing module 11 to operate when determining that the first frequency obtained by the first obtaining unit 102 is in the pre-stored operating frequency range and determining the first channel number that is obtained by the first obtaining unit 102 is in the channel number range in the pre-stored operating status. That is to say, the protocol processing module 11 is configured to: when being triggered by the determination module 13, send a bandwidth negotiation request carrying the first frequency and the first channel number to the bus controller of the first peer end to determine whether or not the bus controller of the first peer end is capable of controlling the physical component of the first peer end to receive data via the channel corresponding to the first channel number according to the first frequency obtained by the first power consumption control module 10.

By using the above modules, the bus controller in this embodiment implements bandwidth adjustment, which is the same as the implementation mechanism of the above relevant method embodiments in the patent. For details, reference may be made to the description in the above relevant method embodiments, and no further description is provided herein.

By using the above modules, the bus controller in this embodiment implements flexible bandwidth adjustment, adjusts bandwidth any time during transmission, and avoids the loss of data, so as to effectively improve the data transmission efficiency. By using the technical solution in this embodiment, a signal convertor such as a SERDES can operate in a more reasonable bandwidth range. Compared with the prior art, the power consumption of the signal convertor can be effectively reduced.

Figure 8:
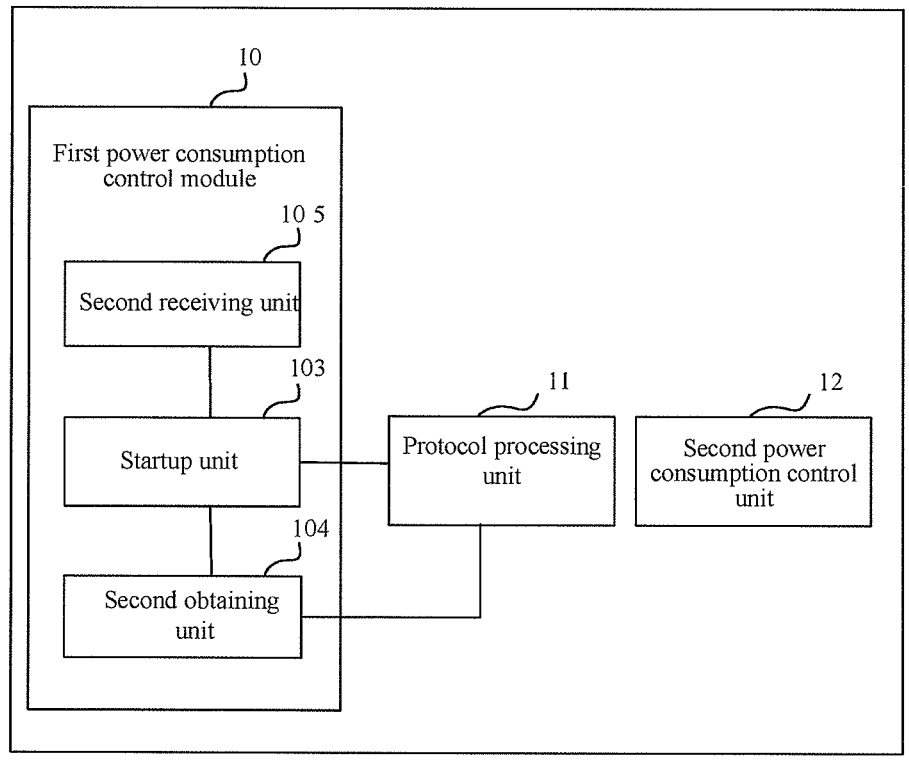
FIG. 8 is a schematic structural diagram of a bus controller according to still another embodiment of the present invention.

FIG. 8 is a schematic structural diagram of a bus controller according to still another embodiment of the present invention. As shown in FIG. 8, the bus controller in this embodiment is based on the embodiment shown in FIG. 6. The first power consumption control module 10 includes a startup unit 103 and a second obtaining unit 104. The startup unit 103 is configured to start target bandwidth detection and obtain a target bandwidth value. The second obtaining unit 104 is connected to the startup unit 103, and the second obtaining unit 104 is configured to obtain the first frequency and the first channel number according to the target bandwidth value obtained by the startup unit 103. At this time, the protocol processing module 11 is connected to the second obtaining unit 104, and the protocol processing module 11 is configured to send a bandwidth negotiation request carrying the first frequency and the first channel number to the bus controller of the first peer end to determine whether or not the bus controller of the first peer end is capable of controlling the physical component of the first peer end to receive data via the channel corresponding to the first channel number according to the first frequency obtained by the second obtaining unit 104.

Optionally, the first power consumption control module in this embodiment may further include a second receiving unit 105. The second receiving unit 105 is connected to the startup unit 103, and the second receiving unit 105 is configured to receive a bandwidth adaptive adjustment start instruction sent by a host and trigger the startup unit 103 to start the target bandwidth detection.

Optionally, the second obtaining unit 104 in this embodiment includes a first obtaining sub-unit and a second obtaining sub-unit. The first obtaining sub-unit is connected to the startup unit 103, and the first obtaining sub-unit is configured to obtain all combinations of frequencies and channel numbers in a bandwidth value range according to the target bandwidth value obtained by the startup unit 103. Each combination of a frequency and a channel number includes a frequency and a channel number. The bandwidth value range is a range between the target bandwidth value obtained by the startup unit 103 and a maximum bandwidth value in pre-stored operating status information. The second obtaining sub-unit is connected to the first obtaining sub-unit. The second obtaining sub-unit is configured to obtain a combination of a frequency with minimum power consumption and a channel number from all the combinations of frequencies and channel numbers that are obtained by the first obtaining sub-unit, and use the frequency in the combination of the frequency with minimum power consumption and the channel number as the first frequency, and the channel number in the combination of the frequency with minimum power consumption and the channel number as the first channel number.

By using the above modules, the bus controller in this embodiment implements bandwidth adjustment, which is the same as the implementation mechanism of the above relevant method embodiments in the patent. For details, reference may be made to the description in the above relevant method embodiments, and no further description is provided herein.

By using the above modules, the bus controller in this embodiment implements flexible bandwidth adjustment, adjusts bandwidth any time during transmission, and avoids the loss of data, so as to effectively improve the data transmission efficiency. By using the technical solution in this embodiment, a signal convertor such as a SERDES can operate in a more reasonable bandwidth range. Compared with the prior art, the power consumption of the signal convertor can be effectively reduced.

Optionally, based on the embodiment shown in FIG. 6, the first power consumption control module 10 may be further specifically configured to obtain an operating frequency with minimum power consumption and a corresponding channel number from the pre-stored operating status information and use them as the first frequency and the first channel number, respectively. The pre-stored operating status information includes multiple combinations of operating frequencies and channel numbers that are supported by the bus controller. Each combination of a frequency and a channel number includes a frequency, a channel number, and corresponding power consumption.

Optionally, based on this technical solution and the technical solutions shown in FIG. 7 and FIG. 8, the second power consumption control module 12 is specifically configured to: when it is determined, according to the negotiation result of the protocol processing module 11, that the bus controller of the first peer end is capable of controlling the physical component of the first peer end to receive data via the channel corresponding to the first channel number according to the first frequency, control the physical component to transmit data via the channel corresponding to the first channel number according to the first frequency, or when it is determined, according to the negotiation result of the protocol processing module 11, that the bus controller of the first peer end is not capable of controlling the physical component of the first peer end to receive data via the channel corresponding to the first channel number according to the first frequency, control the physical component to transmit data continually via channels corresponding to a current channel number according to a current operating frequency.

Optionally, the second power consumption control module 12 is further configured to: when it is determined, according to the negotiation result of the protocol processing module 11, that the bus controller of the first peer end is not capable of controlling the physical component of the first peer end to receive data via the channel corresponding to the first channel number according to the first frequency, send an alarm signal to a host to notify the host that the physical component of the first peer end is not capable of transmitting data via the channel corresponding to the first channel number according to the first frequency.

Optionally, the protocol processing module 11 is further configured to receive a negotiation request carrying a second frequency and a second channel number that is sent by a bus controller of a second peer end. The first power consumption control module 10 is further configured to detect whether the second frequency and the second channel number that are received by the protocol processing module 11 are reasonable. The protocol processing module 11 is further configured to send a result detected by the first power consumption control module 10 to the bus controller of the second peer end.

The first power consumption control module 10 is specifically configured to detect whether the second frequency is in the pre-stored operating frequency range and detect whether the second channel number is in a pre-stored channel number range, where when the second frequency is in the pre-stored operating frequency range and the second channel number is in the pre-stored channel number range, the detection result is reasonable; otherwise, when the second frequency is not in the pre-stored operating frequency range and/or the second channel number is not in the pre-stored channel number range in the operating status, the detection result is not reasonable.

In the foregoing embodiment, by using the above modules, bandwidth adjustment is implemented, which is the same as the implementation mechanism of the above relevant method embodiments in the patent. For details, reference may be made to the description in the above relevant method embodiments, and no further description is provided herein.

By using the above modules, the bus controller using the above technical solution implements flexible bandwidth adjustment, adjusts bandwidth any time during transmission, and avoids the loss of data, so as to effectively improve the data transmission efficiency. By using the technical solution in this embodiment, a SERDES can operate in a more reasonable bandwidth range. Compared with the prior art, the power consumption of a signal convertor can be effectively reduced.

Figure 9:
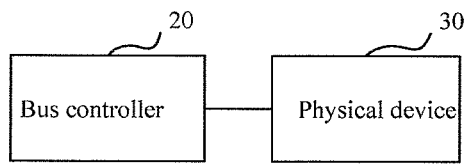
FIG. 9 is a schematic structural diagram of a signal convertor according to an embodiment of the present invention.

FIG. 9 is a schematic structural diagram of a signal convertor according to an embodiment of the present invention. As shown in FIG. 9, a signal convertor in this embodiment includes a bus controller 20 and a physical device 30.

The bus controller 20 is configured to obtain a first frequency and a first channel number. The first frequency and the first channel number are a target frequency and a target channel number that need to be adjusted. The bus controller 20 sends a bandwidth negotiation request carrying the first frequency and the first channel number to a bus controller of a first peer end to determine whether or not the bus controller of the first peer end is capable of controlling a physical component of the first peer end to receive data via a channel corresponding to the first channel number according to the first frequency, and controls the physical device 30 to transmit data according to the negotiation result.

By using the bus controller 20, the signal convertor in this embodiment implements bandwidth adjustment, which is the same as the implementation mechanism of the above relevant method embodiments. For details, reference may be made to the description in the above relevant method embodiments, and no further description is provided herein.

Optionally, by using the bus controller in the above relevant bus controller embodiments, the bus controller in this embodiment may further implement bandwidth adjustment. For details, reference may be made to the description in the above relevant embodiments, and no further description is provided herein.

By using the bus controller, the signal convertor in this embodiment can implement flexible bandwidth adjustment, adjust bandwidth any time during transmission, and avoid the loss of data, so as to effectively improve the data transmission efficiency. By using the technical solution in this embodiment, the signal convertor can operate in a more reasonable bandwidth range. Compared with that in the prior art, a signal convertor operates in a high and unadjustable bandwidth, the power consumption of the signal convertor can be effectively reduced.

The described apparatus embodiment is merely exemplary. The units described as separate parts may or may not be physically separated, and parts displayed as units may or may not be physical units, which may be located in one position, or may be distributed on at least two network elements. A part of or all of the modules may be selected according to the actual needs to achieve the objectives of the solutions of the embodiments. Persons of ordinary skill in the art may understand and implement the embodiments without creative efforts.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not make the essence of corresponding technical solutions depart from the spirit and scope of the technical solutions of the embodiments of the present invention.

What is claimed is:

1. A bandwidth adjustment method, comprising:
obtaining a target bandwidth value;
obtaining, by a bus controller, a first frequency and a first channel number according to the target bandwidth value, wherein the target bandwidth value is equal to a product of a valid payload, the first frequency, and the first channel number, wherein the target bandwidth value is expressed by the formula $M=k*f*N$, where M indicates the target bandwidth value, k indicates the valid payload, f indicates the first frequency, and N indicates the first channel number;

sending, by the bus controller, a bandwidth negotiation request carrying the first frequency and the first channel number to a bus controller of a first peer end;

receiving, by the bus controller, a negotiation result sent by the bus controller of the first peer end;

in response to the bus controller determining, according to the negotiation result, that the bus controller of the first peer end is capable of controlling the physical component of the first peer end to receive data via the channel corresponding to the first channel number according to the first frequency, controlling, by the bus controller, the physical component to transmit data via the channel corresponding to the first channel number according to the first frequency; and in response to the bus controller determining, according to the negotiation result, that the bus controller of the first peer end is not capable of controlling the physical component of the first peer end to receive data via the channel corresponding to the first channel number according to the first frequency, controlling, by the bus controller, the physical component to transmit data continually via channels corresponding to a current first channel number according to a current operating frequency.

2. The method according to claim 1, wherein obtaining, by a bus controller, a first frequency and a first channel number comprises:

receiving, by the bus controller, a bandwidth adjustment request sent by a host, wherein the bandwidth adjustment request carries the first frequency and the first channel number; and obtaining the first frequency and the first channel number from the bandwidth adjustment request.

3. The method according to claim 2, further comprising:

after obtaining, by the bus controller, the first frequency and the first channel number, and before sending, by the bus controller, a bandwidth negotiation request carrying the first frequency and the first channel number to a bus controller of a first peer end, determining, by the bus controller, that the first frequency is in a pre-stored operating frequency range and determining the first channel number is in a pre-stored channel number range in an operating status.

4. The method according to claim 1, wherein obtaining, by a bus controller, a first frequency and a first channel number comprises:

obtaining, by the bus controller, from pre-stored operating status information, an operating frequency with minimum power consumption and a corresponding channel number, and using them as the first frequency and the first channel number, respectively, wherein the pre-stored operating status information comprises multiple combinations of operating frequencies and channel numbers that are supported by the bus controller; and each combination of a frequency and a channel number comprises a frequency, a channel number, and corresponding power consumption.

5. The method according to claim 1, further comprising:

receiving, by the bus controller, a bandwidth adaptive adjustment start instruction sent by a host.

6. The method according to claim 1, wherein obtaining, by the bus controller, the first frequency and the first channel number according to the target bandwidth value comprises:

obtaining, by the bus controller, all combinations of frequencies and channel numbers in a bandwidth value range from pre-stored operating status information, wherein each combination of a frequency and a channel number comprises a frequency, a channel number, and corresponding power consumption; and the bandwidth value range is a range between the target bandwidth value and a maximum bandwidth value in the pre-stored operating status information; and obtaining, by the bus controller, a combination of a frequency with minimum power consumption and a channel number in all the combinations of frequencies and channel numbers from the bandwidth value range; using the frequency in the combination of the frequency with minimum power consumption and the channel number as the first frequency, and the channel number in the combination of the frequency with minimum power consumption and the channel number as the first channel number.

7. The method according to claim 1, further comprising:

when the bus controller determines, according to the negotiation result, that the bus controller of the first peer end is not capable of controlling the physical component of the first peer end to receive data via the channel corresponding to the first channel number according to the first frequency, sending, by the bus controller, an alarm signal to the host to notify the host that the physical component is not capable of transmitting data via the channel corresponding to the first channel number according to the first frequency.

8. The method according to claim 1, further comprising:

receiving, by the bus controller, a negotiation request carrying a second frequency and a second channel number that is sent by a bus controller of a second peer end;

detecting, by the bus controller, whether the second frequency and the second channel number are within a pre-stored range; and sending, by the bus controller, a detection result to the bus controller of the second peer end.

9. The method according to claim 8, wherein detecting, by the bus controller, whether the second frequency and the second channel number are within a pre-stored range comprises:

detecting, by the bus controller, whether the second frequency is in the pre-stored operating frequency range and detecting whether the second channel number is in a pre-stored channel number range, wherein when the second frequency is in the pre-stored operating frequency range and the second channel number is in the pre-stored channel number range, the detection result is within a pre-stored range; otherwise, when the second frequency is not in the pre-stored operating frequency range and/or the second channel number is not in the pre-stored channel number range in the pre-stored operating status, the detection result is not within a pre-stored range.

10. A bus controller, comprising:

a processor; and memory coupled to the processor comprising instructions that, when executed by the processor, cause the bus controller to:

obtain a target bandwidth value;

obtain a first frequency and a first channel number according to the target bandwidth value, wherein the target bandwidth value is equal to a product of a valid payload, the first frequency, and the first channel number, wherein the target bandwidth value is expressed by the formula $M=k*f*N$, where M indicates the target bandwidth value, k indicates the valid payload, f indicates the first frequency, and N indicates the first channel number;

send a bandwidth negotiation request carrying the first frequency and the first channel number to a bus controller of a first peer end;

receive a negotiation result sent by the bus controller of the first peer end;

in response to determining, according to the negotiation result, that the bus controller of the first peer end is capable of controlling the physical component of the first peer end to receive data via the channel corresponding to the first channel number according to the first frequency, control the physical component to transmit data via the channel corresponding to the first channel number according to the first frequency; and in response to determining, according to the negotiation result, that the bus controller of the first peer end is not capable of controlling the physical component of the first peer end to receive data via the channel corresponding to the first channel number according to the first frequency, control the physical component to transmit data continually via channels corresponding to a current first channel number according to a current operating frequency.

11. The bus controller according to claim 10, wherein the memory further comprises instructions that, when executed by the processor, cause the bus controller to:

receive a bandwidth adjustment request sent by a host, wherein the bandwidth adjustment request carries the first frequency and the first channel number; and obtain the first frequency and the first channel number from the bandwidth adjustment request.

12. The bus controller according to claim 11, wherein the memory further comprises instructions that, when executed by the processor, cause the bus controller to:

determine that the first frequency is in a pre-stored operating frequency range and determine the first channel number is in a pre-stored channel number range in an operating status.

13. The bus controller according to claim 10, wherein the memory further comprises instructions that, when executed by the processor, cause the bus controller to: obtain, from pre-stored operating status information, an operating frequency with minimum power consumption and a corresponding channel number, and use them as the first frequency and the first channel number, respectively, wherein the pre-stored operating status information comprises multiple combinations of operating frequencies and channel numbers that are supported by the bus controller; and each combination of a frequency and a channel number comprises a frequency, a channel number, and corresponding power consumption.

14. The bus controller according to claim 10, wherein the memory further comprises instructions that, when executed by the processor, cause the bus controller to:

receive a bandwidth adaptive adjustment start instruction sent by a host.

15. The bus controller according to claim 10, wherein the memory further comprises instructions that, when executed by the processor, cause the bus controller to:

obtain all combinations of frequencies and channel numbers in a bandwidth value range from pre-stored operating status information, wherein each combination of a frequency and a channel number comprises a frequency, a channel number, and corresponding power consumption; and the bandwidth value range is a range between the target bandwidth value and a maximum bandwidth value in the pre-stored operating status information; and obtain a combination of a frequency with minimum power consumption and a channel number from all the combinations of frequencies and channel numbers, use the frequency in the combination of the frequency with minimum power consumption and the channel number as the first frequency, and use the channel number in the combination of the frequency with minimum power consumption and the channel number as the first channel number.

16. The bus controller according to claim 10, wherein the memory further comprises instructions that, when executed by the processor, cause the bus controller to:

when it is determined, according to the negotiation result, that the bus controller of the first peer end is not capable of controlling the physical component of the first peer end to receive data via the channel corresponding to the first channel number according to the first frequency, send an alarm signal to a host to notify the host that the physical component is not capable of transmitting data via the channel corresponding to the first channel number according to the first frequency.

17. The bus controller according to claim 10, wherein the memory further comprises instructions that, when executed by the processor, cause the bus controller to:

receive a negotiation request carrying a second frequency and a second channel number that is sent by a bus controller of a second peer end;

detect whether the second frequency and the second channel number are within a pre-stored range; and send a detection result to the bus controller of the second peer end.

18. The bus controller according to claim 17, wherein the memory further comprises instructions that, when executed by the processor, cause the bus controller to: detect whether the second frequency is in the pre-stored operating frequency range and detect whether the second channel number is in a pre-stored channel number range; wherein when the second frequency is in the pre-stored operating frequency range and the second channel number is in the pre-stored channel number range, the detection result is within a pre-stored range; otherwise, when the second frequency is not in the pre-stored operating frequency range and/or the second channel number is not in a pre-stored channel number range in a pre-stored operating status, the detection result is not within a pre-stored range.

* * * * *